(12) United States Patent
Chang et al.

(10) Patent No.: US 7,752,504 B2
(45) Date of Patent: Jul. 6, 2010

(54) SYSTEM DIAGNOSTICS WITH DYNAMIC CONTEXTUAL INFORMATION OF EVENTS

(75) Inventors: Steve Chen-Lin Chang, Cupertino, CA (US); Ludwig Alexander Clemm, Los Gatos, CA (US); Junekang Yang, Palo Alto, CA (US); Jiabin Zhao, Saratoga, CA (US); Shyyunn Sheran Lin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 405 days.

(21) Appl. No.: 11/756,465

(22) Filed: May 31, 2007

(65) Prior Publication Data
US 2008/0301506 A1 Dec. 4, 2008

(51) Int. Cl.
*G06F 11/00* (2006.01)
(52) U.S. Cl. ........................................... 714/48
(58) Field of Classification Search ............ 714/4, 714/15, 16, 18, 20, 21, 39, 47, 48, 57
See application file for complete search history.

(56) References Cited

U.S. PATENT DOCUMENTS

| | | | |
|---|---|---|---|
| 6,367,034 B1 * | 4/2002 | Novik et al. | 714/39 |
| 6,912,486 B2 * | 6/2005 | Wang | 702/188 |
| 7,426,538 B2 * | 9/2008 | Bodin et al. | 709/204 |
| 7,519,659 B2 * | 4/2009 | Bodin et al. | 709/204 |
| 7,519,683 B2 * | 4/2009 | Bodin et al. | 709/218 |
| 2002/0116516 A1 * | 8/2002 | Pedersen et al. | 709/231 |
| 2003/0135382 A1 * | 7/2003 | Marejka et al. | 705/1 |
| 2004/0260519 A1 * | 12/2004 | Wang | 702/188 |
| 2006/0015558 A1 * | 1/2006 | Bodin et al. | 709/204 |
| 2007/0174449 A1 * | 7/2007 | Gupta | 709/224 |
| 2008/0046556 A1 * | 2/2008 | Nicholls et al. | 709/224 |

OTHER PUBLICATIONS

Baron, A., et al., *Access Cookbook*, Chapter 7.2, O'Reilly Publishing, (2002), 7 p.

* cited by examiner

*Primary Examiner*—Nadeem Iqbal
(74) *Attorney, Agent, or Firm*—Schwegman, Lundberg & Woessner, P.A.

(57) ABSTRACT

A network device and a method for monitoring operational messages is described. The method comprises monitoring an occurrence of an operational message of the network device, and storing dynamic context information at the time that the operational message occurred. The stored dynamic context information is then associated with the operational message. The operational message (e.g., a syslog message) may be stored together with the dynamic context information in a metalog memory and may comprise a snapshot of a procedure stack, the procedure stack including information indicative of a sequence of procedure invocations.

43 Claims, 10 Drawing Sheets

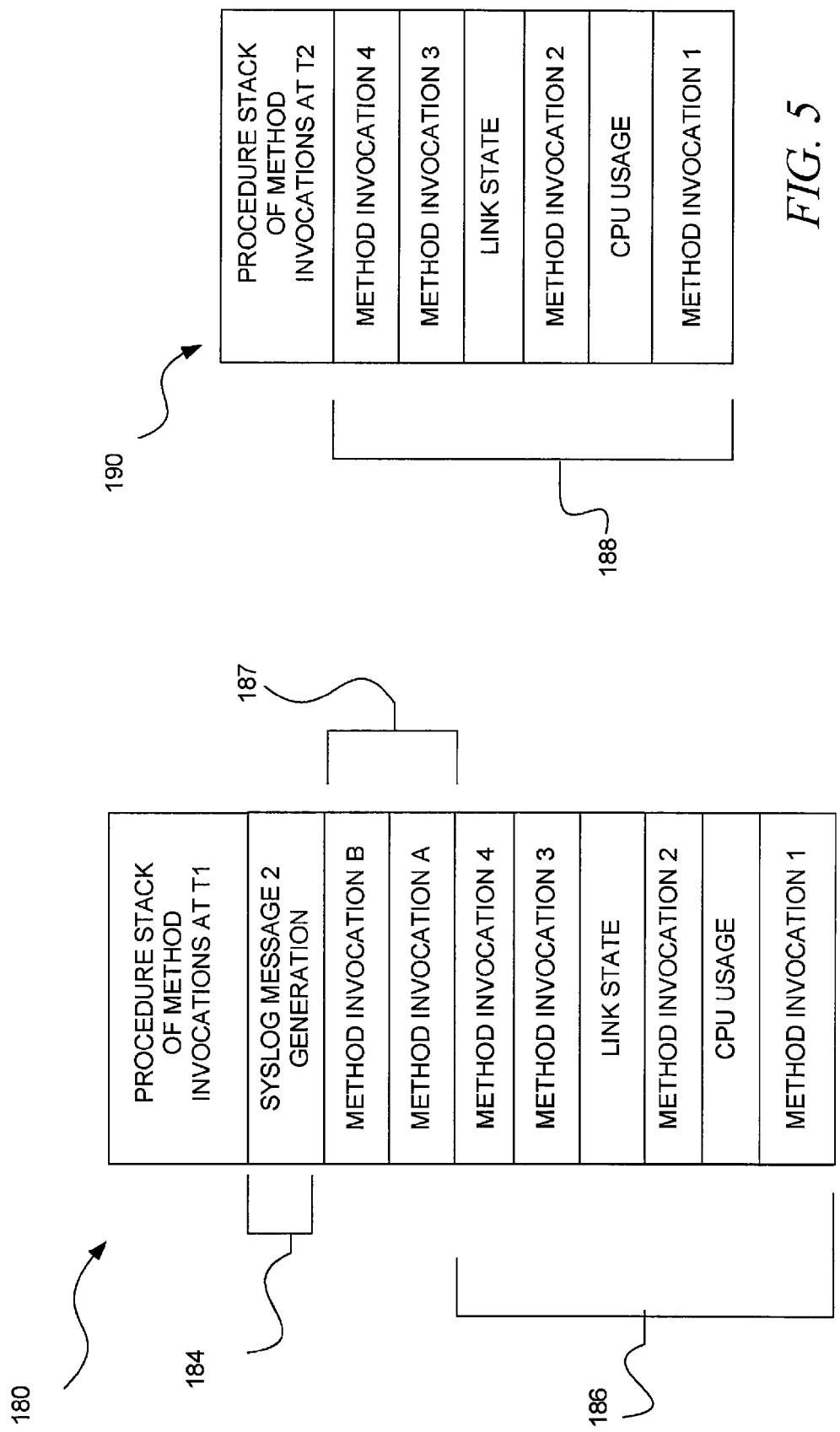

SYSTEM DIAGNOSTICS WITH DYNAMIC CONTEXTUAL INFORMATION OF EVENTS

FIELD

The present disclosure relates generally to system diagnostics, particularly to system diagnostics in a computer network.

BACKGROUND

System or event messages are usually automatically generated when specific events occur during operation of a computer system or computer network. Usually the most useful system or event messages are those generated when an error occurs in a system or network. In a network, the system or event messages are typically "syslog" messages.

A syslog message may often provide important information to diagnose error conditions in a network. However, in many cases, situations are encountered in which a problem is indicated by a syslog message, but the information that is provided with the syslog message does not provide sufficient information about what caused it. Network users often require assistance from Technical Assistance Centers (TAC) or help desks with diagnostics that involve such messages. In such cases, information about the dynamic context under which the message occurred is helpful, specifically information about what processing occurred at the network device when the message was generated, as similar messages are often generated from very different processing paths within the device. Knowing the processing or procedure stack when a particular message was generated may therefore be of value; however, by the time diagnostics occurs and a particular syslog message is recognized as being crucial, the state may of the system have changed some time ago. Turning on debug-level messages in many cases provides the necessary information, but it generates too much traffic for real-world operations, and reproducing the exact same error condition (and turning on debug only for that duration) may not be practical and convenient.

BRIEF DESCRIPTION OF DRAWINGS

Example embodiments are illustrated by way of example and not limitation in the figures of the accompanying drawings, in which like references indicate similar elements and in which:

FIGS. 4 and 5 respectively show schematic views of a procedure stack associated with the system of FIG. 1 at two different points in time;

DESCRIPTION OF EXAMPLE EMBODIMENTS

In the following description, for purposes of explanation, numerous specific details are set forth in order to provide a thorough understanding of example embodiments. It will be evident, however, to one skilled in the art that the present embodiments or other embodiments may be practiced without these specific details.

Overview

In an example embodiment, there is provided a method comprising monitoring occurrence of an operational message of a network device, storing dynamic context information at the time that the operational message occurred; and associating the stored data with the operational message.

Example Embodiments

Figure 1:
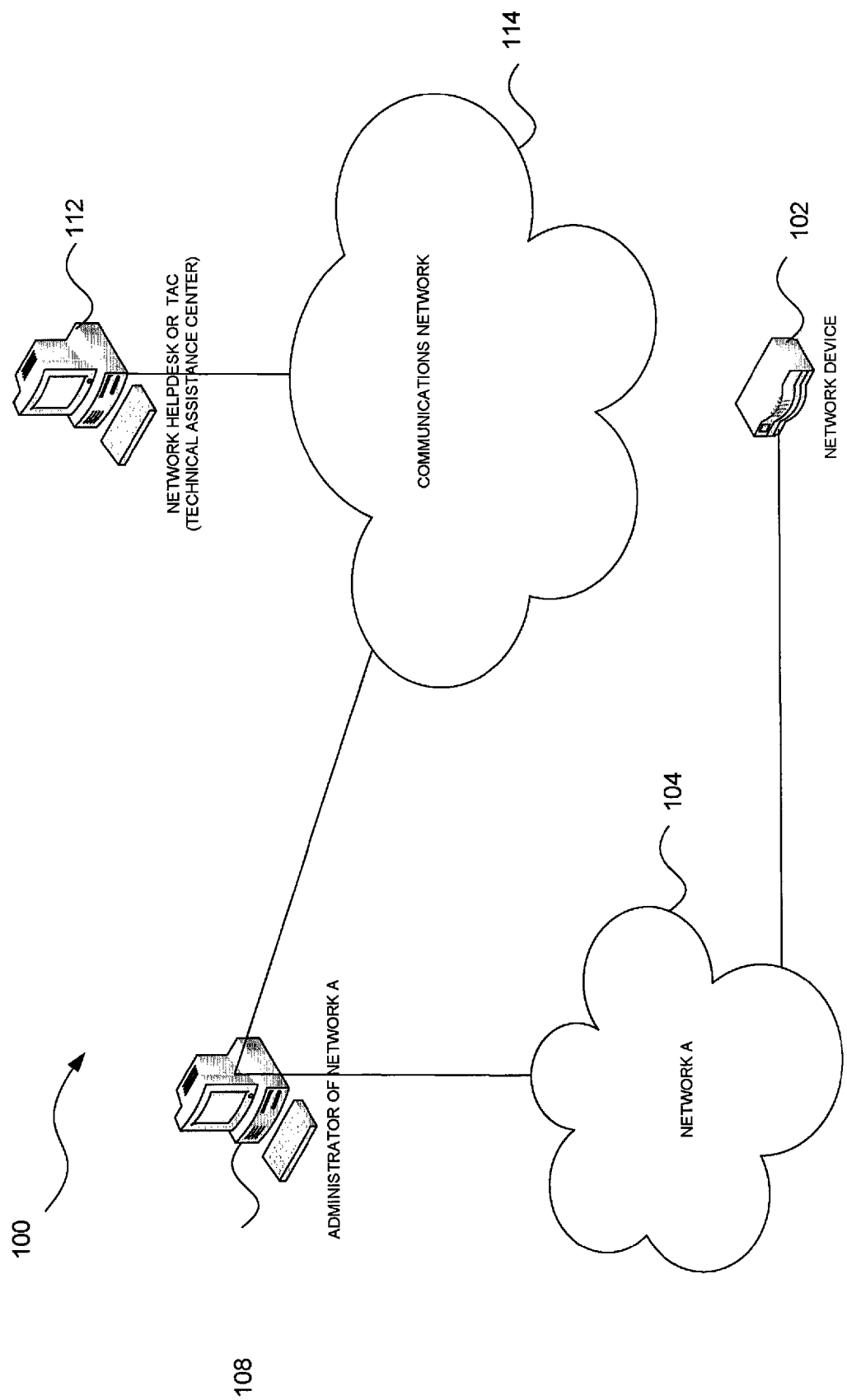
FIG. 1 shows a schematic view of a system which comprises a network device including Administrator and TAC, in accordance with an example embodiment.

FIG. 1 shows a system 100 which includes a network device 102 in accordance with an example embodiment. The network device 102 may be in the form of a switch, hub, router, or any other network device or node.

In instances where the network device 102 is a router, the network device 102 may be operable to link at least two networks together (e.g, one being network A 104). Network A 104 may be a packet switched network and may form part of the Internet. Instead, network A 104 may be a circuit switched network, public switched data network, or the like. It is to be appreciated that network A 104 may include systems of linked computers, or like devices. The system 100 may include a plurality of networks, but only network A 104 is shown, for ease of explanation.

The system 100 may further include an administrator 108 of network A 104; and a network Helpdesk or a TAC (Technical Assistance Center) 112 operable to interface with the network device 102 and also with the administrator 108 over a communications network 114. The communications network 114 may be a packet switched network and may form part of the Internet. Instead, the communications network 114 may be a circuit switched network, public switched data network, telephony network (e.g., a POTS network), or the like. The administrator 108 may be operated by human operators. Alternately, the administrator 108 may be, or be operated by, an automated computer system. The administrator 108 may be any user of network A 104.

In accordance with an example embodiment, network device 102 may be operable to send system or event messages, typically syslog messages, to the administrator 108 when an event such as a fault or error occurs in the network A 104 or in the network device 102, shown by way of example in FIG. 1. Although the syslog messages notify the administrator 108 of the fault or error in the network A 104 or the network device 102, they often do not provide adequate information, if any, as to the cause of the error or the dynamic/real-time state or context of network A 104 or the network device 102 at the time when the syslog message was generated. If more information regarding the generation of a received syslog message is required, the recipient of the syslog message, the administrator 108, may communicate with the network helpdesk or TAC 112 via the communications network 114, to query the received syslog message. The recipient of the syslog message, the administrator 108, may query the dynamic state or context of the Network A 104 at the time of generation of the received syslog message. The Network Helpdesk or TAC 112 may be operable to interact with the network device 102 for example by way of a CLI (command line interface), to obtain information pertaining to a particular received syslog message, while such information exists, and communicate such obtained information to the querying administrator 108.

Figure 2:
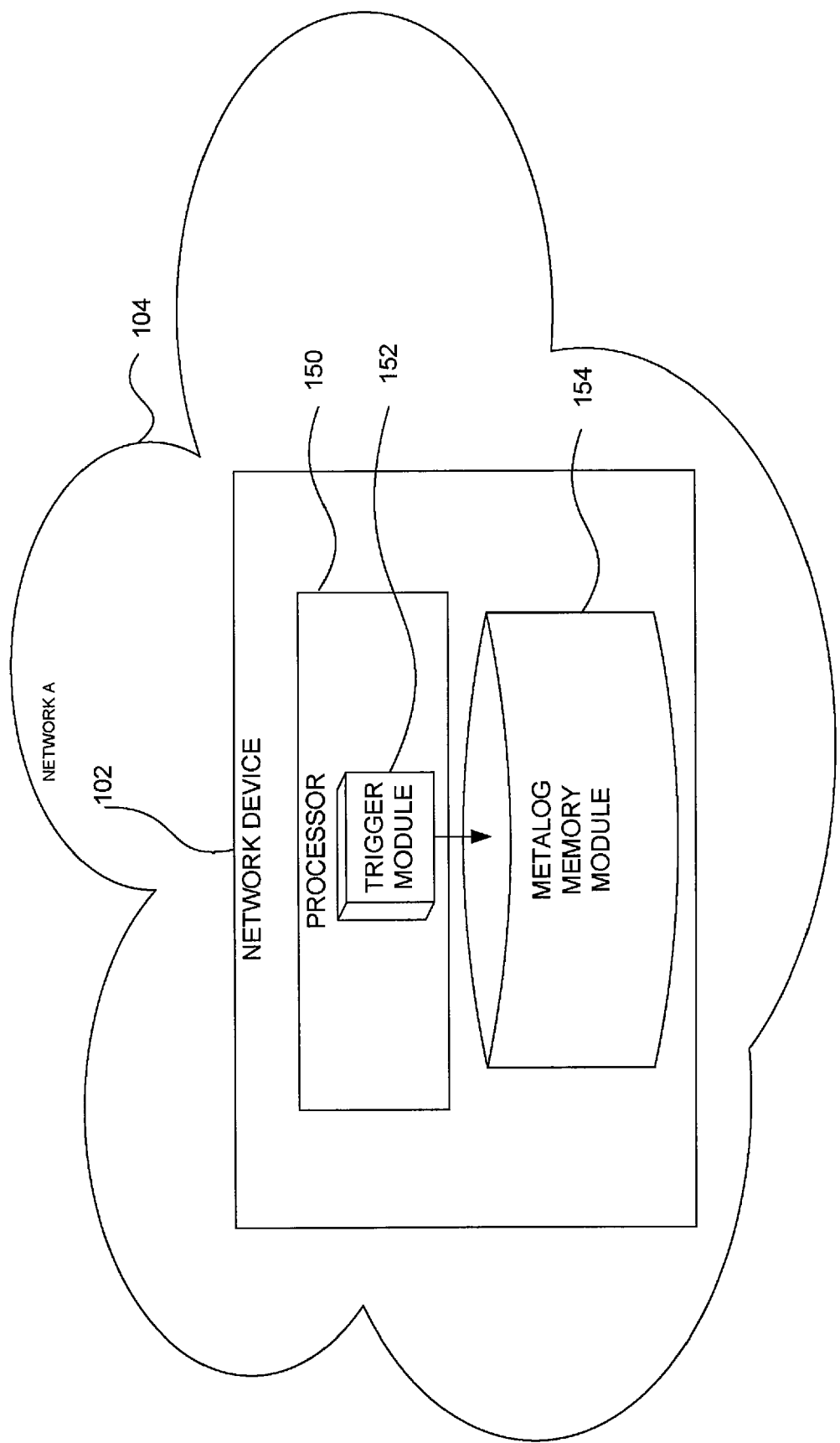
FIGS. 2 and 3 show schematic views of a network device, in accordance with an example embodiment.
Figure 3:
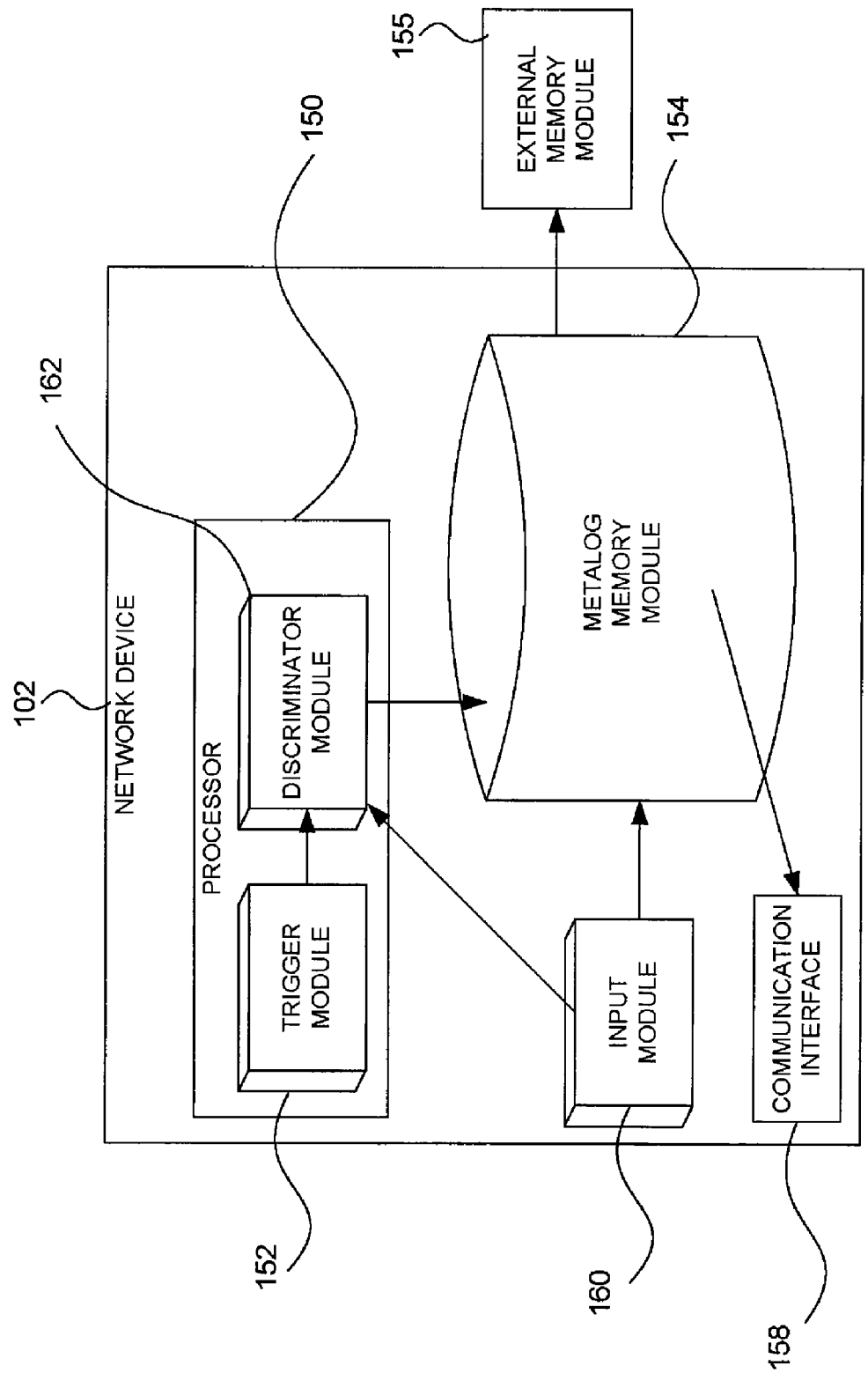

Referring now also to FIGS. 2 to 3, network device 102 is shown in more detail by way of example to include a plurality of functional components. It is to be appreciated that the functional components are not necessarily consolidated into one device, but may be distributed among a number of devices.

Broadly, the network device 102 includes a processor 150 and a metalog memory module 154 (described in greater detail below), as shown in FIG. 2. The processor comprises or defines a trigger module 152 which is a conceptual module corresponding to a functional task performed by the processor 150. The trigger module 152 may define a monitoring module (or circuit) to monitor the occurrence of an operational message at a network device. To this end, the network device 102 may include a machine-readable medium, e.g. memory in the processor 150, main memory, and/or hard disk drive, which carries a set of instructions to direct the operation of the processor 150, for example being in the form of a computer program or any embedded logic. It is to be understood that the processor 150 may be one or more microprocessors, controllers, or any other suitable computing device, resource, hardware, software, or embedded logic. The trigger module 152 may be operable, in response to the generation of a syslog message to store information in the metalog memory module 154. The metalog memory module 154 may be any volatile or non-volatile memory in the network device 102 e.g. in-memory cache of the network device 102, or the like. When the metalog memory module includes non-volatile memory the information stored therein is not lost upon shutdown or failure of the network device 102 thus providing persistence of the information stored therein. The network device 102 is shown in FIG. 2 to be within the network A 104, however, it is to be appreciated that the network device 102 may connect to network A 104, as shown in FIG. 1. It is to be noted that, for the purposes of this specification, the term "module" includes an identifiable portion of code, computational or executable instructions, data, or computational object to achieve a particular function, operation, processing, or procedure. A module need not be implemented in software; a module may be implemented in software, hardware, or a combination of software and hardware.

In particular, the network device 102 may include a communication interface 158 (see FIG. 3) which is operable to transmit, receive, or transfer packets of data between network A 104 and other networks respectively; and a user input module 160 which may be operable to receive input data from a user of the network device 102. The communication interface 158 may also be operable to enable communication between the network device 102 and the network helpdesk or TAC 112 of FIG. 3. The user input module 160 may include an API (Application Programming Interface), GUI (Graphical User Interface), a keypad, or the like. Instead, or in addition, the user input module 160 may include or utilize a CLI of the network device 102. In an example embodiment, the input module 160 is remote from the network device 102.

The processor 150 further includes a discriminator module 162 operable to receive an input from the trigger module 152 and to dispatch an output (e.g., a filtered output) to the metalog memory module 154. It is to be understood that the discriminator module 162 may also be a conceptual module corresponding to a particular task performed by the processor 150. The discriminator module 162 may only create a metalog entry for a message when the particular message meets defined criteria.

The discriminator module 162 may be operable to analyze an incoming syslog message to determine whether or not the syslog message meets discriminating criteria (e.g. pre-defined criteria or default criteria and thus subject to rules dictating the manner in which it will be treated). The discriminator module 162 may also be operable to store the information associated with the interrogated syslog message in the metalog memory module 154 only in response to the syslog message meeting the pre-selected criteria or default criteria. The discriminator module 162 may thereby function as an intelligent filter for incoming syslog messages. The default criteria may be defined by a network technician or the like. It will be understood that, in accordance with an example embodiment, the discriminator module 162 may, in addition to the default criteria, receive discriminating criteria for which to interrogate the syslog message from a user, either a network technician, the administrator 108, or the network helpdesk or TAC 112 or the like, via the user input module 160. In this regard, the discriminator module 162 may include a user-definable discriminating data structure associated therewith to allow for selection of the discriminating criteria in addition to or instead of the default criteria. In accordance with an example embodiment, the data structure of the discriminator may provide for a user to select the discriminating criteria (e.g., rules) from one or more of a syslog message facility, severity level, mnemonic, format, body, feature flags, or component-specific data (usually user-specific data), etc. of the syslog message.

The metalog memory module 154 will be described by way of example in greater detail with reference to FIGS. 4 to 7. The metalog memory module 154 may be operable to receive and store information associated with a syslog message. The information may include at least the procedure stack of method invocations, or data associated therewith, generally referred to by reference numerals 180 and 190 respectively, at the time of generation of the syslog message and information to identify the syslog message. It is to be appreciated that the procedure stacks 180 and 190 are merely schematic representations of a procedure stack of invocations in accordance with an example embodiment at two different points in time (e.g. T1 and T2 respectively).

The procedure stack 180, 190 increases and decreases in size in a last in-first out fashion (LIFO) and includes information indicative of, or referenced to, the procedure invocations or method invocations 186, 187 and 188. The method invocations may include those procedural or functional calls, or a trace thereof, made by the network A 104 during normal operation. It is to be understood that the method invocations may further include information indicative of dynamic context information, for example, feature module specific data, CPU usage, link states, or the like. Each time a method invocation is made, reference thereto is entered in the procedure stack 180, 190 such that dynamic context information indicative of the operation of network A 104 or the network device 102 is included in the procedure stack 180, 190. The LIFO configuration causes the reference to each of the method invocations 186, 187, and 188 to be entered or pushed onto the top of the procedure stack 180, 190 in the order which it is generated or invoked, and the reference to the method invocations 186, 187 and 188 at the top of the stack 180, 190 to be removed or popped therefrom first, after execution of the respective method invocation. In the example embodiment illustrated, the method invocations 186 and 187 (see invocations 1 to 4 as well as the dynamic context information, CPU usage and link state, and A and B in FIG. 4) are shown to be made before the syslog message 2 was generated. In this regard, it is to be appreciated that the syslog message generation involves a corresponding syslog message procedure or method invocation 184 and reference thereto is correspondingly pushed onto the stack 180, 190. For example, in FIG. 4, at time T1, reference to the method invocation 184, which corresponds to the generation of syslog message 2, is pushed onto the top of the procedure stack 180 upon generation thereof.

In FIG. 5, at time T2, the syslog message 2 has been emitted and the method invocations B and A have been executed, the corresponding references thereto, 184 and 187 respectively, are therefore popped from the procedure stack 190 in LIFO fashion leaving those unfinished method invocations 188 therein. In an example embodiment, the information to identify or reference to a particular syslog message may be the name of that particular syslog message, and/or a time stamp, and/or a particular mnemonic of that particular syslog message.

In accordance with an example embodiment, the metalog memory module 154 may include a circular metalog or circular buffer 164 (see FIG. 6 and 7) in which the identifier of a syslog message is storable, together with the procedure stack of method invocations 186 and 187 (see FIG. 4) at the time of generation of the syslog message (e.g. syslog message 2). For ease of explanation, the circular metalog 164 will be described with reference to the procedure stack 180 of FIG. 4. It is to be appreciated that the circular metalog 164 may be a conceptual data structure provided in the metalog memory module 154. Further, the circular metalog 164 may be of user-configurable size, and the size thereof may be received via the user input module 160. For further ease of explanation, the circular metalog 164 will be described as having a size of eight conceptual data storage cells (Cell 1 to Cell 8) in which data is storable. It is to be appreciated that the data storage cells merely serve to illustrate the storage of data in the circular metalog 164.

In accordance with an example embodiment, the circular metalog 164 may be operable to receive the procedure stack of method invocations upon generation of a syslog message which meets the discriminating criteria as determined by the discriminator module 162 (see FIG. 3). In accordance with an example embodiment, with reference to the method invocations 187 and 186 in the procedure stack 180, the procedure stack 180 at the time of generation of the syslog message 2 184 may be shifted into the circular metalog 164, register-fashion (see FIGS. 6 and 7). It is to be appreciated that in an example embodiment, the procedure stack 180 may be shifted register-fashion into the circular metalog 164 in no particular order. The circular metalog 164 may be in the form of a buffer so that, when the buffer is full, the oldest entry may be overwritten.

Figure 6:
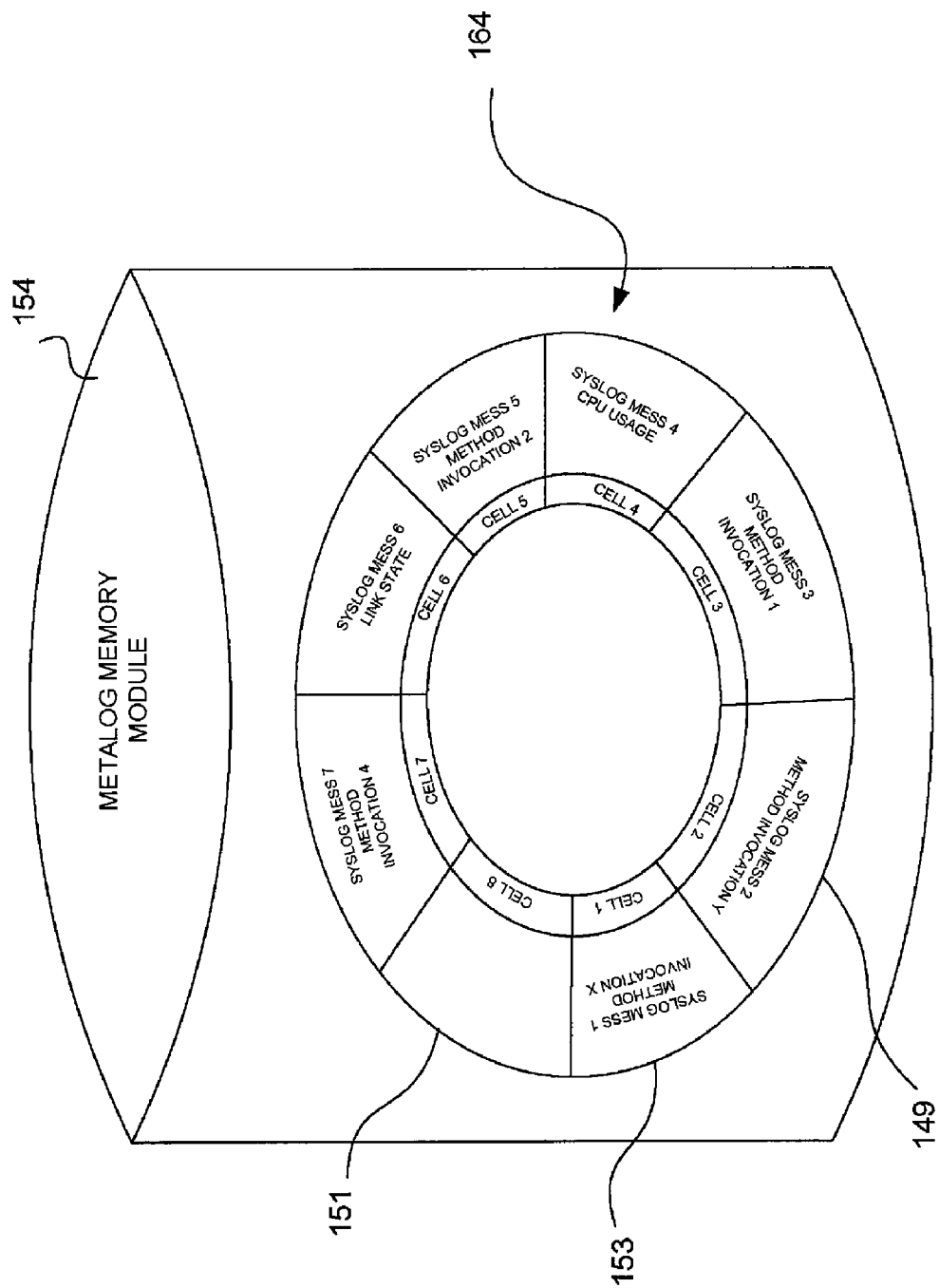
FIGS. 6 and 7 respectively show schematic views of a metalog memory module of the network device, in accordance with an example embodiment.

The circular metalog 164, as indicated in FIG. 6, contains old entries in cell 1 153 and cell 2 149 respectively from a previous syslog message generation (syslog message 1), however, the metalog 164 is not full and the next invocation in the procedure stack 180 (method invocation A) may be shifted register-fashion into empty cell 8 151.

Figure 7:
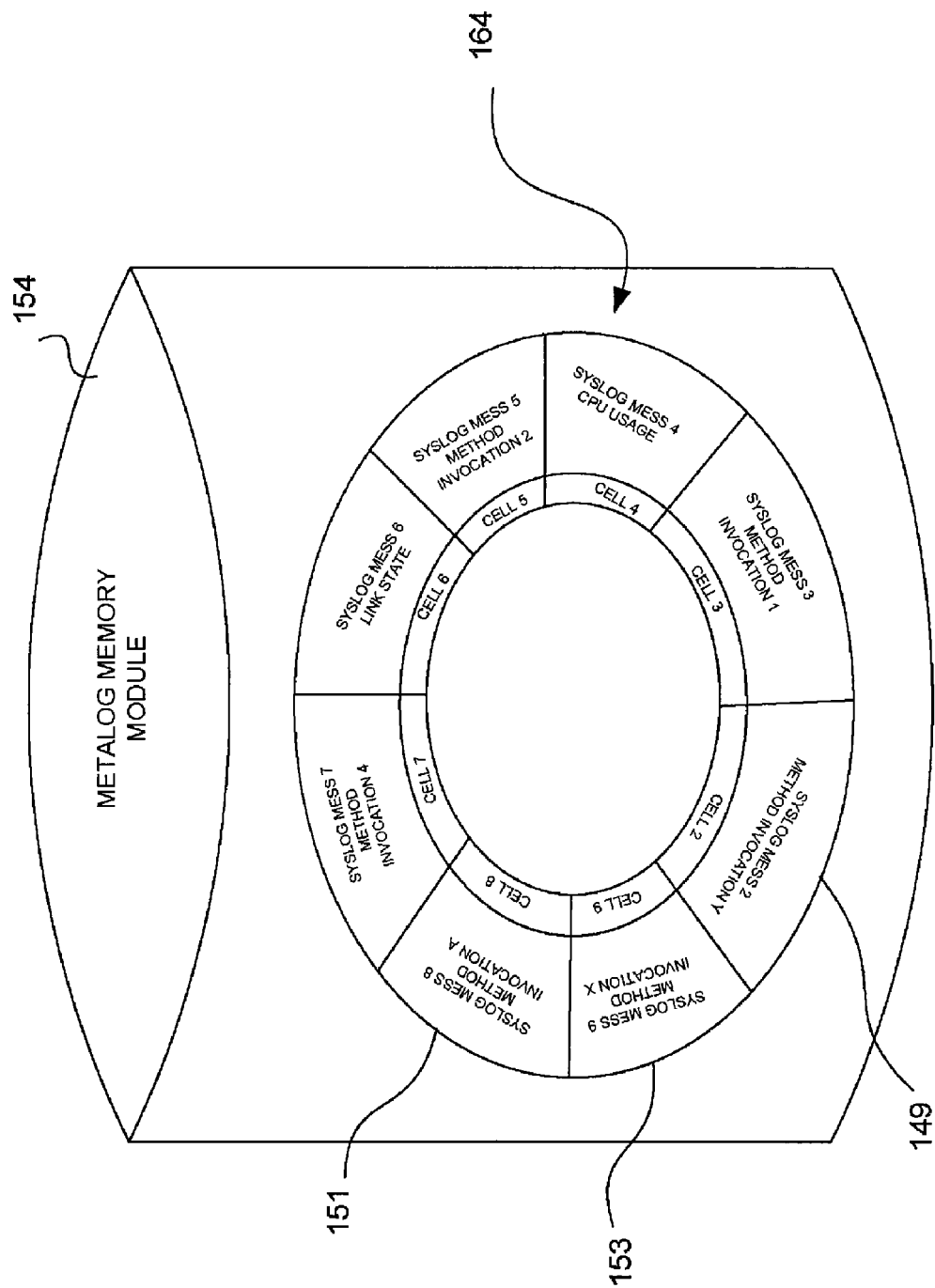

It is to be appreciated that the circular metalog 164 may be operable to wrap when full such that the oldest entries therein are overwritten on entry of new information (e.g. first in, first out). For example, FIG. 7 shows the circular metalog 164 being full, and the next entry from the procedure stack 180 to be entered in the metalog 164 (method invocation B) will therefore have to overwrite the oldest entry in the circular metalog 164 which is method invocation X in cell 9 153. In accordance with an example embodiment, the overwritten entries may be irrecoverably erased.

Example embodiments will now be further described in use with reference to FIGS. 8 to 11. The example methods shown in FIGS. 8 to 11 are described with reference to FIG. 1 and FIGS. 2 to 7, although it is to be appreciated that the example methods may be applicable to other systems as well.

Figure 8:
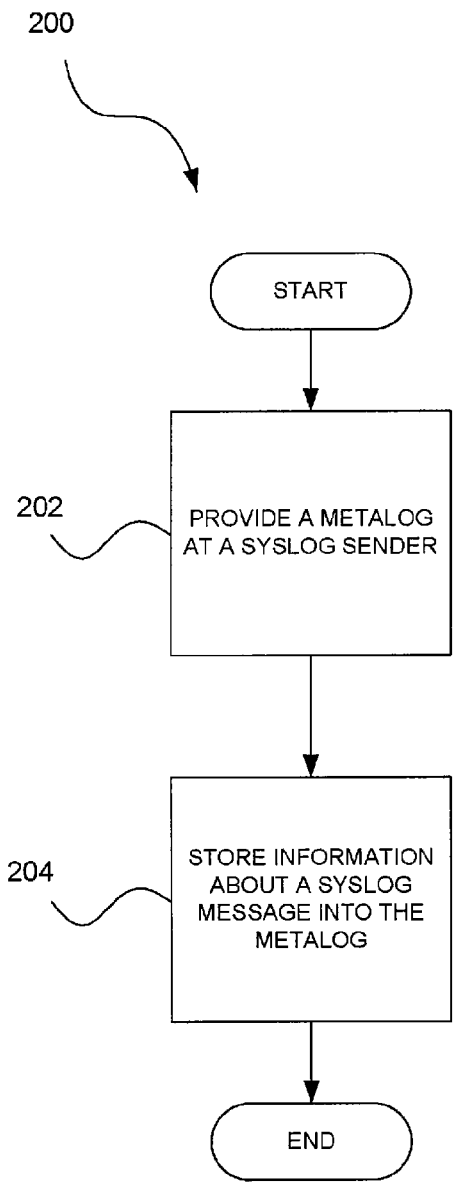
FIGS. 8 and 9 respectively show high-level flow diagrams of methods, in accordance with example embodiments, of determining the dynamic context in which a system or event message was generated by a system or network.

FIG. 8 shows a high-level flow diagram of a method 200, in accordance with an example embodiment, of determining the dynamic context in which a system or event message was generated by a system or network. The method 200 comprises providing, at block 202, a metalog (e.g. a circular metalog 164) at a syslog message sender for storing information about a syslog message upon generation thereof. In an example embodiment, the syslog sender may be the network device 102. The method 200 further comprises storing, at block 204, the information about the syslog message in the metalog 164, the information being indicative of the syslog message, or a procedure stack 180 (method invocations), or data associated therewith, of the network at the time of the generation of the syslog message.

Figure 9:
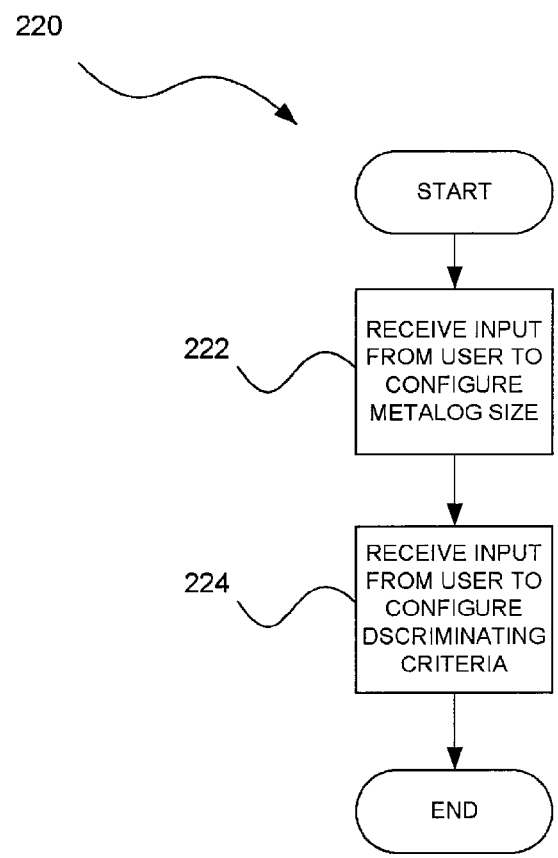

Referring now to FIG. 9, a high-level flow diagram of a method 220, in accordance with an example embodiment, is shown. The method 220 may be performed prior the operations in the method 200 as described above. The method 220 may include receiving, at block 222, an input to configure the size of the metalog 164. In an example embodiment, the input is received via the user input module 160. The method 220 may also include receiving, at block 224, an input, from the input module 160, to select discriminating criteria for the discriminator module 162. It is to be understood that the size of the metalog 164 and the discriminating criteria may be user-specific.

Figure 10:
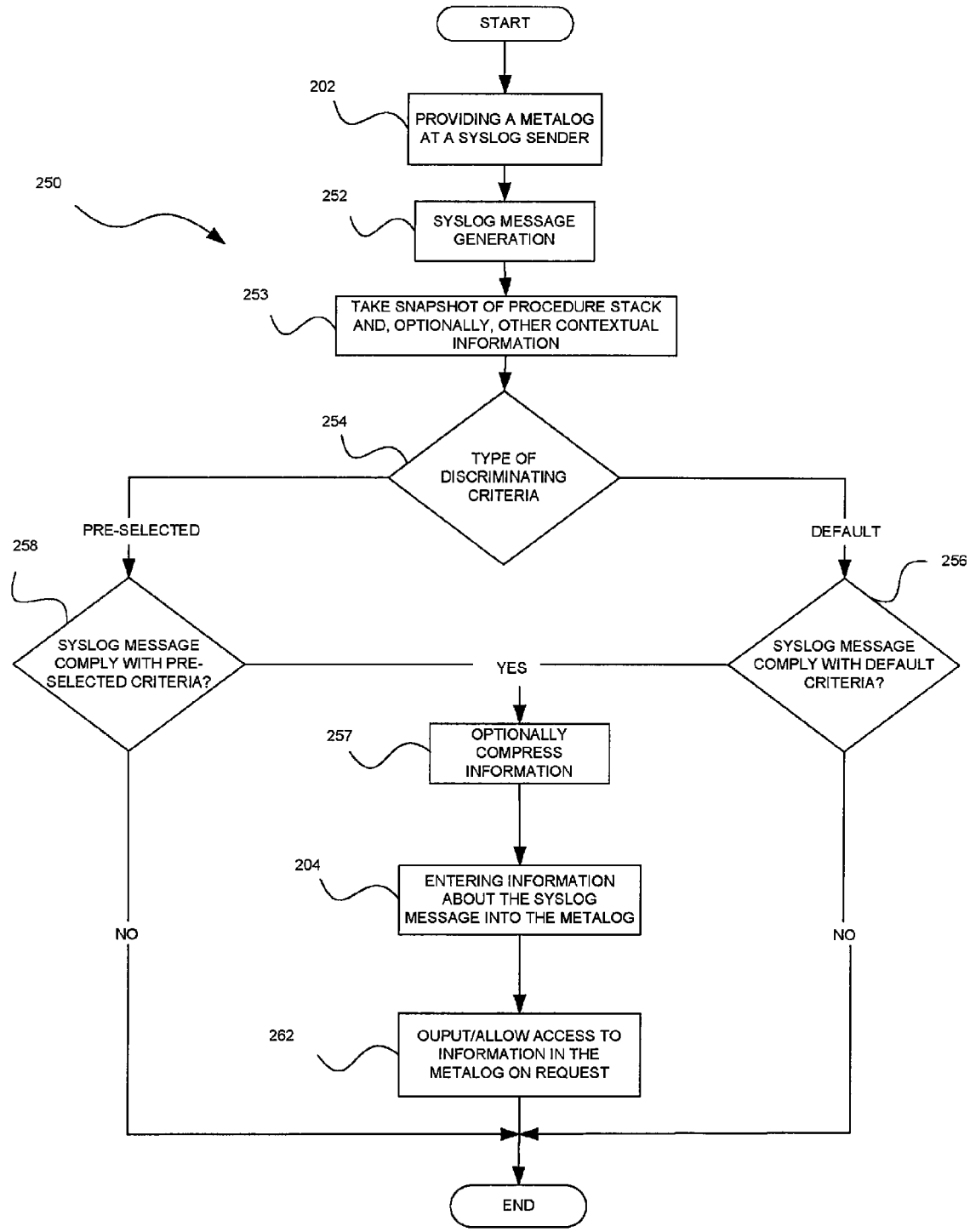
FIG. 10 shows a low-level flow diagram of a method, in accordance with an example embodiment, of determining the dynamic context in which a system or event message was generated by a system or network.

Referring now to FIG. 10, a low-level flow diagram of a method 250 in accordance with an example embodiment is shown. Like numerals to FIG. 8 refer to like parts in FIG. 10 unless otherwise indicated. Again, a metalog 164 is provided at a syslog message sender, at block 202.

When a syslog message is generated at block 252, for instance when an error or fault occurs in the network A 104 or in the network device 102, the trigger module 152 detects the syslog message generation and transmits the syslog message to the discriminator module 162. At block 253, the method 250 includes taking a snapshot of the procedure stack at the exact time the syslog message was generated.

The processor 150 determines, at block 254, the type of discriminating criteria (e.g., rules) which the syslog message has to comply with, in other words whether the discriminating criteria is pre-selected or default discriminating criteria in the example embodiment.

The discriminator module 162 of the network device 102 determines, at block 258 and 256, whether the syslog message meets the pre-selected or default discriminating criteria such as the syslog message severity level, facility, mnemonic, or the like, respectively. In an example embodiment, pre-selected discriminating criteria have preference over default discriminating criteria. Thus, the discriminator 162 may determine whether or not the syslog message meets the pre-selected discriminating criteria before it determines whether the syslog message meets the default discriminating criteria, if necessary.

If the syslog message complies with either the pre-selected discriminating criteria or the default discriminating criteria, the procedure stack of invocations 180, at the time of generation of the syslog message, or the snapshot thereof, may be compressed or encoded, at block 257, to compress the procedure stack 180, and make it human readable. The information about the syslog message stored in the metalog 164 may also include a sequence number, time-stamp, facility, and mnemonic of the syslog message thereby to identify the syslog message. As shown at block 262, the information entered into the metalog may be output, or access may be allowed to the information in the metalog request.

Alternatively, if the discriminator module 162 determines that the syslog message does not meet the pre-selected or default discriminating criteria, the information about the syslog message is not stored in the metalog 164. It is to be understood that the method 250 does not necessarily store information about all the syslog messages that are generated in the metalog 164, but may store information about the syslog message in the metalog 164 only if the syslog message meets the pre-selected or default discriminating criteria (or rules). In an example embodiment, storing of the information into the metalog 164 may be invoked as part of the syslog message generation.

Once stored in the metalog 164, the information therein may be outputted or uploaded, or accessed from the metalog memory module 154, by way of the communication interface 158. The information in the metalog 164 may be accessed by or outputted or uploaded to the network helpdesk 112, or the administrator 108, or the like. In accordance with an example embodiment, the network helpdesk or TAC 112, or the administrator 108 has access to the information from the metalog 164 via a CLI provided on the network device 102, a GUI or a software map of the network device 102 provided at the network helpdesk or TAC 112, or the administrator 108, and the like. With the information obtained from the metalog 164, the network helpdesk or TAC 112, or the administrator 108, may be able to determine the dynamic context in which the syslog message was generated by looking at the method invocations that were made leading up to the generation of the syslog message, thus aiding troubleshooting and diagnostics. In this regard, the information in the metalog 164 may be searchable or parsable thereby to enable specific entries therein to be located and accessed. In accordance with an example embodiment, the network device 102 may be operable to generate a log file based on a particular syslog message, from the metalog 164, particularly in response to a request thereof by the network helpdesk or TAC 112, the administrator 108, or the like.

Figure 11:
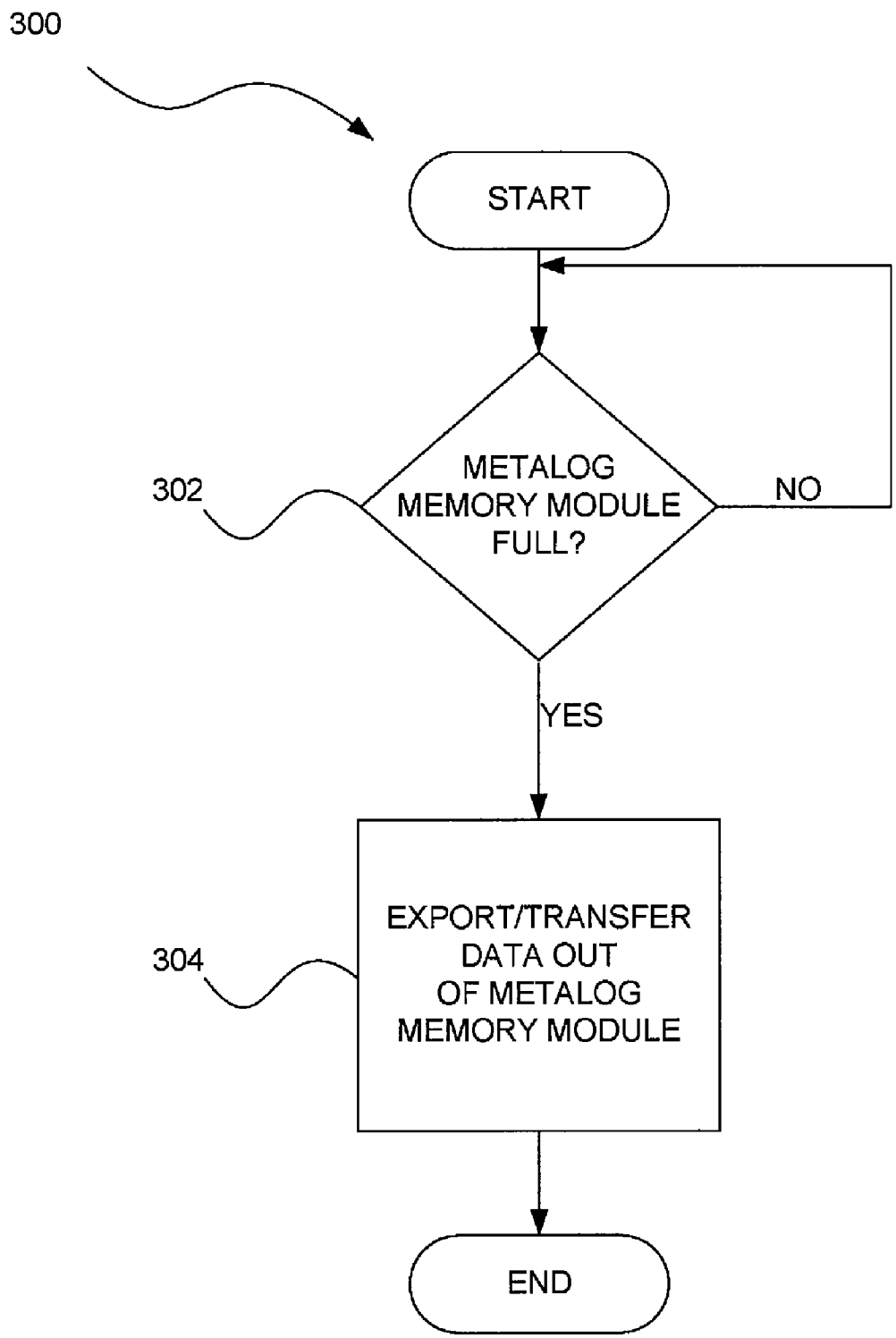
FIG. 11 shows a high-level flow diagram of a method, in accordance with an example embodiment, of data handling in the network device of FIG. 1 and FIGS. 2 and 3.

Referring now to FIG. 11, a high-level flow diagram of a method 300, in accordance with an example embodiment, of data handling in the network device 102 is shown. The method 300 includes determining, at block 302, whether or not the metalog memory module 154 is full, in other words whether the information in the metalog memory module 154 exceeds the information storage capacity of the metalog memory module 154.

In accordance with an example embodiment, upon receiving a user command, the method 300 may include exporting or transferring, at block 304, the information stored therein out of the metalog memory module 154. In accordance with an example embodiment, the information in the metalog memory module 154 may be exported to the external memory module 155 (see FIG. 3).

Thus, advantages of example embodiments may include retention of the dynamic context of event messages that are usually irrevocably lost. Recipients of syslog messages e.g. the network helpdesk or TAC 112, and the administrator 108, often do not know the circumstances under which a received syslog message was generated, as the system state has since changed, example embodiments of the invention, as above described, may improve interpretation of the syslog messages and thereby improve system diagnostic and troubleshooting.

Figure 12:
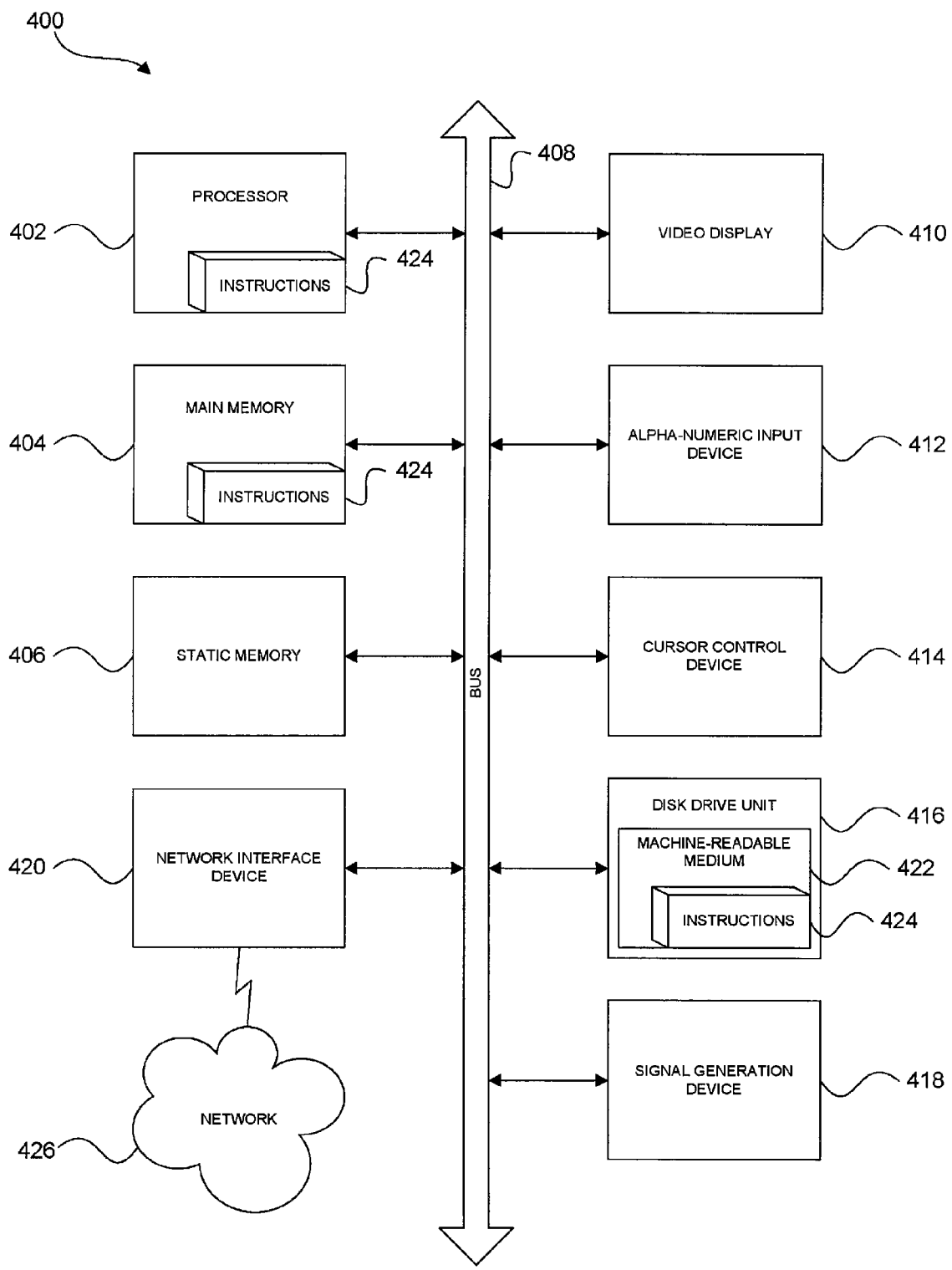
FIG. 12 shows a diagrammatic representation of a machine in the example form of a computer system within which a set of instructions, for causing the machine to perform any one or more of the methodologies discussed herein, may be executed.

FIG. 12 shows a diagrammatic representation of machine in the example form of a computer system 400 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing a set of instructions for execution by the machine and that cause the machine to perform anyone or more of the methodologies of the example embodiments, or that is capable of storing data structures utilized by or associated with such a set of instructions. The term "machine-readable medium" shall accordingly be taken to include, but not be limited to, solid-state memories, optical and magnetic media, and carrier wave signals.

The network device 102 as described example embodiments could be in the form of computer system 400.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   at a network device,
      monitoring an occurrence of an operational message of the network device, the operational message being a syslog message;
      storing dynamic context information at a time that the operational message occurs;
      associating the stored dynamic context information with the operational message; and
      storing in a metalog at least one of a syslog sequence number, a time stamp of the syslog message, an identifier to identify the network device, or a mnemonic to identify the syslog message.

2. The method of claim 1, wherein storing the dynamic context information comprises storing data from a procedure stack.

3. The method of claim 1, wherein storing the dynamic context information comprises storing operational or statistical data.

4. The method of claim 1, wherein storing the dynamic context information comprises storing configuration data.

5. The method of claim 1, further comprising storing the operational message together with the dynamic context information in the metalog, wherein the storing comprises overwriting an oldest entry with a newest entry in a circular buffer.

6. The method of claim 5, further comprising communicating the metalog to persistent storage.

7. The method of claim 1, wherein the dynamic context information comprises a snapshot of a procedure stack, the procedure stack including information identifying a sequence of procedure invocations.

8. The method of claim 1, further comprising:
   determining if the operational message meets discriminating criteria; and
   storing the data from a procedure stack in the metalog based on the discriminating criteria.

9. The method of claim 8, wherein the discriminating criteria comprises a severity of an operational message.

10. The method of claim 1, further comprising communicating the dynamic context information to persistent storage upon failure of the network device.

11. The method of claim 1, further comprising:
    enabling or disabling storage of the data in the metalog; and
    receiving input from a user to select a discriminating criteria which the operational message must meet before the dynamic context information is stored in the metalog.

12. The method of claim 1, further comprising invoking an Application Program Interface to communicate data in a procedure stack to the metalog.

13. The method of claim 1, further comprising generating a log file corresponding to the metalog to facilitate searching the dynamic context information.

14. A network device, comprising:
    monitor circuitry to monitor an occurrence of an operational message at the network device, the operational message being a syslog message; and
    metalog memory to store dynamic context information at a time that the operational message occurred, the stored dynamic context information being associated with the operational message, and the metalog memory further to store at least one of a syslog sequence number, a time stamp of the syslog message, an identifier to identify the network device, or a mnemonic to identify the syslog message.

15. The network device of claim 14, wherein the dynamic context information comprises data from a procedure stack.

16. The network device of claim 14, wherein the dynamic context information comprises operational or statistical data.

17. The network device of claim 14, wherein the dynamic context information comprises configuration data.

18. The network device of claim 14, wherein the operational message is stored together with the data in the metalog memory.

19. The network device of claim 14, wherein the dynamic context information comprises a snapshot of a procedure stack including information identifying a sequence of procedure invocations.

20. The network device of claim 14, wherein the monitor circuitry is configured to determine whether the operational message meets discriminating criteria, and wherein the dynamic context information is retrieved from a procedure stack and stored in the metalog memory based on the discriminating criteria.

21. The network device of claim 20, wherein the discriminating criteria comprise a severity of an operational message.

22. The network device of claim 14, wherein the metalog memory is a circular buffer.

23. The network device of claim 14, wherein data is selectively stored in the metalog memory based on defined discriminating criteria.

24. The network device of claim 14, wherein the network device is a router or switch.

25. A network device comprising:
    metalog memory; and
    one or more processors to:
       monitor an occurrence of an operational message at the network device the operational message being a syslog message;
       store dynamic context information at a time that the operational message occurred;
       associate the stored dynamic context information with the operational message; and
       store in the metalog memory at least one of a syslog sequence number, a time stamp of the syslog message, an identifier to identify the network device, or a mnemonic to identify the syslog message.

26. A machine-readable storage medium embodying instructions which, when executed by a machine, cause the machine to:
    monitor occurrence of an operational message at a network device, the operational message being a syslog message;
    store dynamic context information at a time that the operational message occurred;
    associate the stored dynamic context information with the operational message; and
    store in the metalog memory at least one of a syslog sequence number, a time stamp of the syslog message, an identifier to identify the network device, or a mnemonic to identify the syslog message.

27. A network device comprising:
means for monitoring occurrence of an operational message at the network device, the operational message being a syslog message;
means for storing dynamic context information at a time that the operational message occurred;
means for associating the stored dynamic context information with the operational message; and
means for storing in a metalog at least one of a syslog sequence number, a time stamp of the syslog message, an identifier to identify the network device, or a mnemonic to identify the syslog message.

28. A method comprising:
at a network device,
monitoring an occurrence of an operational message of the network device;
storing dynamic context information at a time that the operational message occurs;
associating the stored dynamic context information with the operational message;
identifying a type of operational message generated to determine if the operational message meets discriminating criteria; and
storing the data from a procedure stack in a metalog based on the discriminating criteria.

29. The method of claim 28, wherein the discriminating criteria comprises a type of operational message or a severity of an operational message.

30. A network device, comprising:
monitor circuitry to monitor an occurrence of an operational message at the network device, to identify a type of operational message generated to determine whether the operational message meets discriminating criteria; and
metalog memory to store dynamic context information at a time that the operational message occurred, the stored dynamic context information being associated with the operational message the dynamic context information being retrieved from a procedure stack and stored in the metalog memory based on the discriminating criteria.

31. The network device of claim 30, wherein the discriminating criteria comprise at least one of a type of operational message or a severity of an operational message.

32. The network device of claim 30, wherein the operational message is a syslog message, the method further comprising storing in a metalog at least one of a syslog sequence number, a time stamp of the syslog message, an identifier to identify the network device, or a mnemonic to identify the syslog message.

33. The network device of claim 30, wherein the metalog memory is a circular buffer.

34. A method comprising:
at a network device,
monitoring an occurrence of an operational message of the network device;
storing dynamic context information at a time that the operational message occurs;
associating the stored dynamic context information with the operational message;
enabling or disabling storage of the data in a metalog; and
receiving input from a user to select a discriminating criteria which the operational message must meet before the dynamic context information is stored in the metalog.

35. A network device, comprising:
monitor circuitry to monitor an occurrence of an operational message at the network device;
metalog memory to store dynamic context information at a time that the operational message occurred, the stored dynamic context information being associated with the operational message;
a discriminator module to enable or disable storage of the data in the metalog memory;
an input module for receiving input from a user to select a discriminating criteria which the operational message must meet before the dynamic context information is stored in the metalog memory.

36. The network device of claim 35, wherein the operational message is a syslog message, and the dynamic context information comprises at least one of a syslog sequence number, a time stamp of the syslog message, an identifier to identify the network device, or a mnemonic to identify the syslog message.

37. The network device of claim 35, wherein the metalog memory is a circular buffer.

38. A method comprising:
at a network device,
monitoring an occurrence of an operational message of the network device;
storing dynamic context information at a time that the operational message occurs; and
associating the stored dynamic context information with the operational message, the operational message being stored together with the dynamic context information in a metalog, the storing comprising overwriting an oldest entry with a newest entry in a circular buffer.

39. The method of claim 38, further comprising communicating the metalog to persistent storage.

40. A network device, comprising:
monitor circuitry to monitor an occurrence of an operational message at the network device; and
metalog memory to store dynamic context information at a time that the operational message occurred, the stored dynamic context information being associated with the operational message, the operational message being stored together with the dynamic context information in the metalog memory, the storing comprising overwriting an oldest entry with a newest entry in a circular buffer.

41. The network device of claim 40, wherein the operational message is a syslog message, and the dynamic context information comprises at least one of a syslog sequence number, a time stamp of the syslog message, an identifier to identify the network device, or a mnemonic to identify the syslog message.

42. The network device of claim 40, wherein the dynamic context information comprises data from a procedure stack.

43. The network device of claim 40, wherein the monitor circuitry is configured to identify a type of operational message generated to determine whether the operational message meets discriminating criteria, and wherein the dynamic context information is retrieved from a procedure stack and stored in the metalog memory based on the discriminating criteria.

* * * * *

UNITED STATES PATENT AND TRADEMARK OFFICE
CERTIFICATE OF CORRECTION

| | | |
|---|---|---|
| PATENT NO. | : 7,752,504 B2 | Page 1 of 1 |
| APPLICATION NO. | : 11/756465 | |
| DATED | : July 6, 2010 | |
| INVENTOR(S) | : Steve C. Chang et al. | |

It is certified that error appears in the above-identified patent and that said Letters Patent is hereby corrected as shown below:

In column 10, line 45, in Claim 25, after "device" insert -- , --.

Signed and Sealed this

Fourteenth Day of September, 2010

David J. Kappos
*Director of the United States Patent and Trademark Office*